March 6, 1951   A. T. SCHMIDT   2,544,359
MOLDING FOR INDIRECT LIGHTING
Filed July 10, 1948
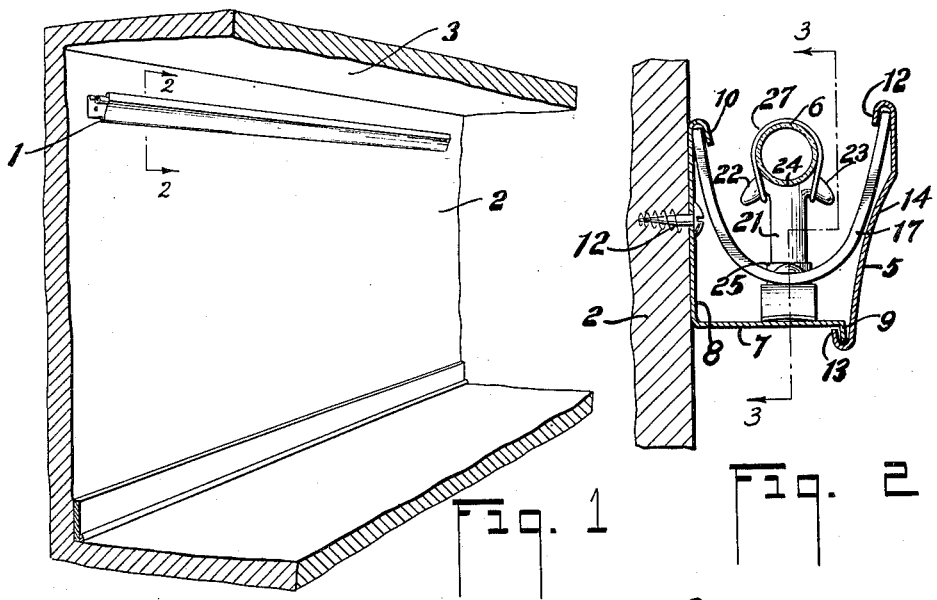
INVENTOR,
Alfred T. Schmidt,
BY
*Malcom Brown*
ATTORNEY Patented Mar. 6, 1951

2,544,359

UNITED STATES PATENT OFFICE 2,544,359

MOLDING FOR INDIRECT LIGHTING

Alfred T. Schmidt, North Hollywood, Calif.

Application July 10, 1948, Serial No. 37,981

3 Claims. (Cl. 240—6)

The present invention has for an object the provision of a molding for a lighting means, such as a fluorescent tube, which is easily attached to a supporting object.

A further object is the provision of a molding wherein certain of the members are detachable to permit access within the molding for the placement or replacement of a fluorescent tube or tubes.

A further object is the provision of a molding so constituted and arranged as to readily hide a fluorescent tube, while permitting indirect lighting, whether said lighting be directed upwardly or downwardly.

A further object is the provision of a molding which may be formed of metal, and wherein a front molding piece of ornamental pattern is held to a second molding piece in such a manner as to permit its ready detachment form the second molding piece.

The molding of the invention may be installed in a structure easily, quickly, and inexpensively. The molding may be incorporated within a showcase, or it may form a part of a baseboard; in fact, in any location where indirect lighting is desired.

The two-part molding of the invention has one part adapted to be secured to a supporting structure, and which part likewise carries the fluorescent tube or tubes. The second part of the molding is of ornamental pattern and interlocks with the first part. It is held so interlocked by a spring tie or clamp, and in such a manner that the ornamental part is easily detachable from the other part. Such an arrangement allows the molding to be easily installed by even unskilled workmen, as one part of the molding may be erected, followed by application of the ornamental part.

Further objects include a molding which is inexpensive in cost of manufacture, easily fabricated, and generally superior to molding now known to the inventor.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claims.

In the drawing:

Figure 1 is a perspective view, partly in section, and showing a room with the improved molding attached to a side wall of said room and adjacent the ceiling thereof, Figure 2 is a sectional view on the line 2—2 of Figure 1, and on an enlarged scale, Figure 3 is a fragmentary view, partly in section, taken on the line 3—3 of Figure 2, and Figure 4 is a detached view of the several parts, the said views being in perspective.

Referring now with particularity to the drawing, I have designated the molding as an entirety by 1, and said molding is shown in Figure 1 as attached to the side wall 2 of a room and adjacent to the ceiling 3 thereof. As shown in Figure 4, the molding includes two pieces or parts 4 and 5, the part 4 being adapted to support a fluorescent tube or tubes 6, and likewise be secured to the wall 2 or other supporting structure. The part 4 comprises an angled piece having sides or legs 7 and 8, the sides being in substantially right-angular relationship. The side 7 is provided with a depending flange lip or tongue 9 along its longitudinal edge, the flange being substantially in right-angular relationship to the side while the side 8 is provided with a returnedly bent, longitudinal edge portion 10 providing an elongated channel or groove 11. It is intended that the side 8 should be secured to a supporting structure in any convenient manner, such as by screws 12.

The front piece 5 of said molding has an ornamental pattern, that shown in the drawing being a modified cover type. However, regardless of the pattern selected, the front piece is provided along its longitudinal edges with returnedly bent portions 12 and 13 which form as between said returnedly bent portions and the front wall 14, elongated channels or grooves 15 and 16.

The two parts of the molding are detachably interlocked by means of a tie which bridges the space between the two parts and cooperates with the returnedly bent portions 10 and 12. A tie includes a U-shaped strap 17, which is pinned or otherwise secured to a transversely positioned bowed leaf spring 18. The bowed leaf spring has two foot portions adjacent its ends, as shown at 19 and 20. Thus, to assemble the two parts of the molding, the ties are positioned on the side 7 in such a manner that the U-shaped strap extends between the two parts of the molding, one end of the strap being received within the channel or groove 11, while the opposite end is adapted to be received within the channel or groove 15 of the molding part 5. Thus, by compressing the leaf spring 18, the flange 9 may be received within the confines of groove 16 of the ornamental molding piece and upon releasing the spring compression, the parts are held together.

The fluorescent tubes are easily supported upon the side 7, posts 21 being provided for this purpose. Each post is provided with a pair of wings or arms 22 and 23, a concave portion 24 in the head thereof, and a metal sleeve 25 having a base portion 26 adapted to be attached to side 7. This attachment may be made by means of solder, screws, or other devices. The fluorescent tube 6 is supported between pairs of posts and within the concavities 24 thereof, with a tie 27 looped between the arms 22 and 23 and over the tube. This is one method of holding fluorescent tubes to posts. Other methods and means may be resorted to but said methods and means form no part of my invention. It will be observed that the U-shaped strap permits insertion of the tie beneath the fluorescent tube without contacting the tube, as illustrated in Figures 2 and 3.

The operation, uses, and advantages of the invention are as follows:

The location for the particular molding of the invention is first selected, that is to say, whether it shall be mounted adjacent a ceiling, in a room, or is to be mounted in a different location such as, for instance, within a showcase. While it is not essential that the fluorescent tubes be hidden from view, yet the effect is more pleasing when the lighting is indirect and the tubes are not visible to the eye of the observer. Assuming, by way of example, that the molding is to be utilized in a room for the purpose of indirectly lighting the same, the molding part 4 is positioned on the side wall 2 for said room at a suitable distance from the ceiling. As a rule, corners for said molding part will be cut at an angle so as to fit with a further like molding part on a wall. One method of erecting procedure is as follows: Having mounted the molding part 4 about the room and on the walls thereof, the fluorescent tubes are positioned upon their posts 21 and tied thereto, it being intended that the posts should be incorporated on the side 7 prior to mounting the molding part 4 on the wall. The various lengths of the fluorescent tubes are interconnected in the usual manner, after which the ornamental front part 5 is placed in position. This ornamental front part may be manufactured to any length so as to extend the entire length of a room, or it may be in sections, the ends being in abutting relationship, such abutting ends not being discernible to the eye. The various ties are next placed in position upon the side 7 of the molding part 4, after which the front piece 5 is held so that the channel or groove portion 15 receives the outermost ends of the U-shaped straps, whereupon depressing the front piece compresses the springs 18 and permits the flange or tongue 9 to be received within the groove 16. Release of pressure from the front piece allows the springs 18 to expand to the position shown in Figure 3, whereby the front piece is held locked to the molding part 4. To remove the ornamental front piece 5, downward pressure thereon will compress the springs 18 of the ties and permit the flange 9 to escape from the groove 16. However, the arrangement is such that decompression of the springs 18 will not release that portion of the straps which are received within the grooves or channels 11. Thus, replacement of burned out fluorescent tubes is easily accomplished and with a minimum of effort.

As stated, the front piece may take any form desired, and the said molding may be painted or otherwise decorated to enhance its ornamental appearance.

I claim:

1. A molding for indirect lighting, including two members, one member provided with two elongated sides in substantially right angular relationship, one side provided with a groove, and the other side provided with a depending flange; the other member of said molding comprising a front piece formed with upper and lower elongated grooves, the elongated flange of the first member adapted to be received in the lower elongated groove of the front piece, and a spring urged tie engaging a side of the first member and received within the elongated groove thereof and the top elongated groove of the front piece.

2. A molding for indirect lighting including two cooperating members forming therebetween a way for the reception of fluorescent tubes, one of said molding members adapted for attachment to a supporting structure and having two sides in substantially right-angular relationship, one side being provided with a depending flange and the other side formed with a channel; the other molding member comprising a front piece having upper and lower returnedly bent longitudinal edge portions to provide upper and lower channels, the lower channel of the front piece adapted to receive the flange; and a tie for reception in the upper channel of the front member and the channel of a side for holding said molding members in working relationship, and spring means for the tie for engagement with one side of the first molding member.

3. In molding construction, an ornamental front piece provided with returnedly bent upper and lower edge portions forming as between said edge portions and the body of said piece, upper and lower grooves; a second piece comprising two sides in substantially right-angular relationship, the outer edge of one side provided with a depending flange and the uppermost edge of the other side provided with a returnedly bent portion forming as between said returnedly bent portion and the said side, a groove; the said depending flange adapted for reception within the lowermost groove of the front piece, a U-shaped strap adapted to extend between and be received within the groove of the side and the uppermost groove of the front piece, and a spring in engagement with one of the sides for urging the strap within the grooves, and for holding the molding parts in working relationship.

ALFRED T. SCHMIDT.

REFERENCES CITED

The following references are of record in the file of this patent:

UNITED STATES PATENTS

| Number | Name | Date |
| --- | --- | --- |
| 918,966 | Clark | Apr. 20, 1909 |
| 1,243,453 | Smith | Oct. 16, 1917 |